United States Patent [19]

Krause

[11] Patent Number: 5,503,185
[45] Date of Patent: Apr. 2, 1996

[54] ELECTROMAGNETIC REVERSING VALVE

[75] Inventor: Harald Krause, Grevenbroich, Germany

[73] Assignee: Pierburg GmbH, Neuss, Germany

[21] Appl. No.: 271,481

[22] Filed: Jul. 7, 1994

[30] Foreign Application Priority Data

Jul. 7, 1993 [DE] Germany .......................... 43 22 564.0

[51] Int. Cl.$^6$ .................................................. F15B 13/044
[52] U.S. Cl. ................................ 137/625.65; 251/129.21
[58] Field of Search .................. 137/625.65; 251/129.21

[56] References Cited

U.S. PATENT DOCUMENTS

| | | | |
|---|---|---|---|
| 3,529,620 | 9/1970 | Leiber | 137/625.65 X |
| 3,817,491 | 6/1974 | Burckhardt et al. | 251/129.21 |
| 3,921,666 | 11/1975 | Leiber | 137/596.17 X |
| 3,983,909 | 10/1976 | Anglade | 137/625.65 |
| 3,989,063 | 11/1976 | Brouwers et al. | 137/596.17 |
| 4,211,257 | 7/1980 | Sakakibara et al. | 137/625.65 |
| 4,326,696 | 4/1982 | Ishikawa et al. | 137/625.65 X |
| 4,944,331 | 7/1990 | Tackett | 137/625.65 |

FOREIGN PATENT DOCUMENTS

| | | | |
|---|---|---|---|
| 1179068 | 10/1964 | Germany | 137/625.65 |
| 1272664 | 7/1968 | Germany | 251/129.21 |
| 3416336 | 11/1985 | Germany | |
| 3716072 | 12/1987 | Germany | |

*Primary Examiner*—Gerald A. Michalsky
*Attorney, Agent, or Firm*—Ladas & Parry

[57] ABSTRACT

An electromagnetic reversing valve in which a slidable armature is supported with clearance in a housing and carries a plastic seal unit for selectively closing first and second channels in the housing upon sliding movement of the armature, the sealing unit provides a separate fluid passage establishing communication between a third channel in the housing and one of the first and second channels when it is unsealed. Since the clearance space around the slidable armature is separate and independent from the fluid passage in the seal unit, it can be made substantially narrower in dimension than the fluid passage, thereby to minimize the iron-free gap between the slidable armature and the surrounding member of the magnetic circuit. The iron-free gap is formed in part by the clearance space and in part by a portion of the housing in which the magnetic circuit member is embedded. In a particular embodiment, the seal unit is formed by a central part joined to an outer part by radial, circumferentially spaced ribs defining the fluid passage.

12 Claims, 1 Drawing Sheet

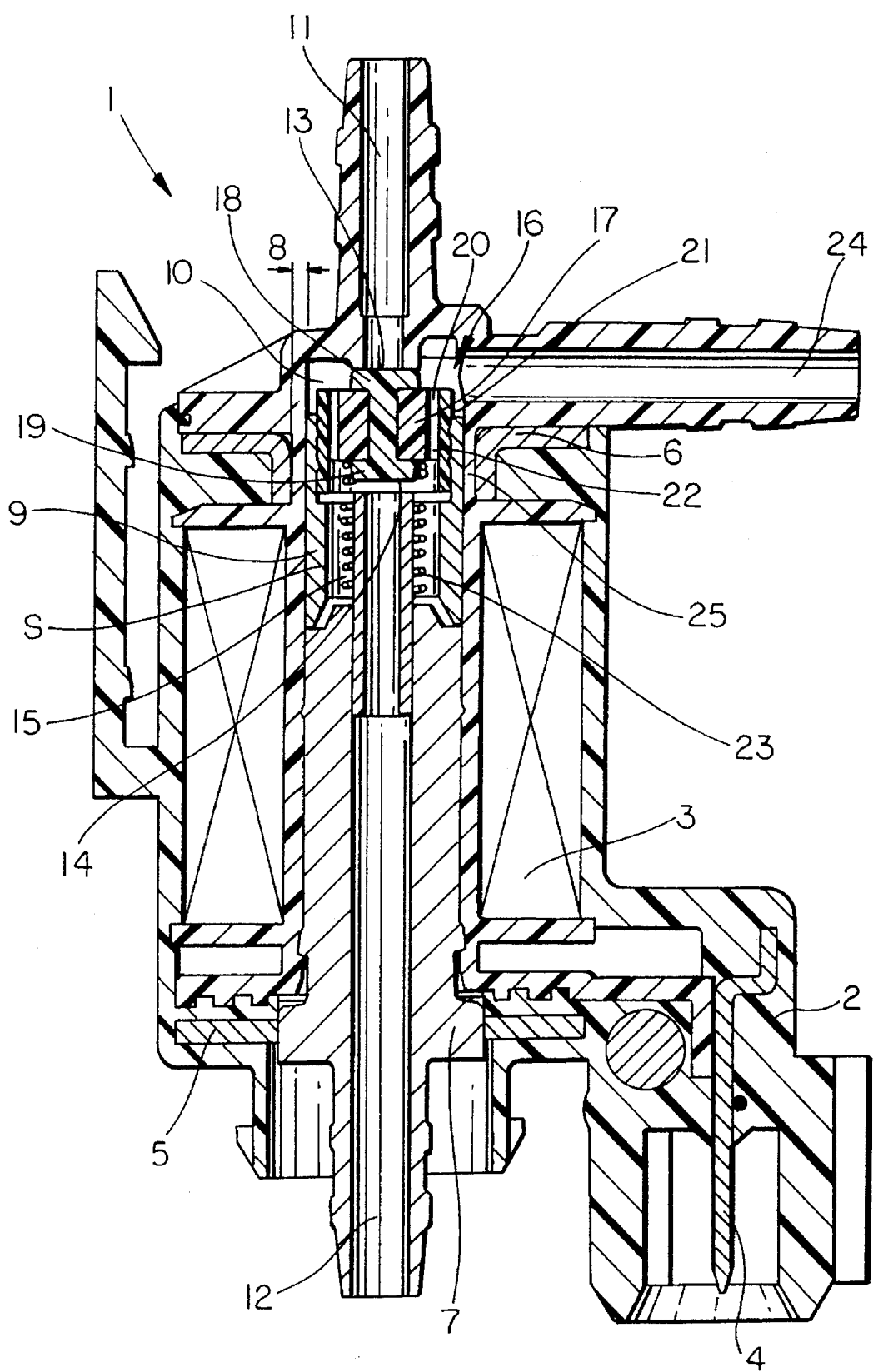

ELECTROMAGNETIC REVERSING VALVE

FIELD OF THE INVENTION

The invention relates to electromagnetic reversing valves of the type in which a slidable armature in a housing forms a valve sealing unit for selectively opening and closing two channels or passages for flow of a fluid.

BACKGROUND AND PRIOR ART

A reversing valve of the above type is disclosed in DE 34 16 336, wherein there are two opposed valve seats, between which is slidably disposed an armature provided with seals.

The armature is slidable in a guide tube having a wall facing the armature provided with longitudinal recesses or grooves to provide fluid flow passageways between the channels. The portions of the guide tube between the longitudinal recesses serve for guiding the armature in its slidable movement.

An electromagnetically actuated valve of a different type is disclosed in DE 37 16 072, in which the armature is configured with a valve sealing part movable in a guide borehole, through which a fluid passes. For this purpose, the valve sealing part comprises a cylindrical base unit having a smooth outer surface which forms passages for flow of the fluid.

In electromagnetic reversing valves, there is need to minimize the reluctance of the magnetic circuit consisting of a yoke, a pole tube and the armature, i.e., minimizing the iron-free spacing between the structural parts.

The arrangement in DE 34 16 366 doesn't meet this criteria, since the recesses extending in the longitudinal direction of the armature guide tube form part of the iron-free gap. The construction in DE 37 16 072 in which smooth surfaces are provided for the formation of fluid passages increases the iron-free gap between the armature and the pole tube if applied to the type of valve according to the invention.

SUMMARY OF THE INVENTION

An object of the invention is to provide means by which the iron-free gaps can be substantially reduced in the magnetic circuit of a reversing valve of the type according to the invention.

In accordance with the invention, the slidable armature carries a plastic unit which provides the seals for sealing the first and second channels in the housing while also providing fluid communication between a third channel in the housing and one of the unsealed first and second channels. Thereby, the fluid communication between the channels is obtained independently of the necessary clearance for the sliding movement of the armature and consequently, the clearance can be made very much smaller than the fluid passage. Thereby, the iron-free gap between the armature and the surrounding pole tube of the magnetic circuit, which extends across the clearance space, can be minimized.

According to a particular embodiment of the invention, the slidable armature is disposed for sliding movement, under the action of the magnetic circuit, between longitudinally spaced first and second channels and the armature carries sealing means for selectively sealing said first and second channels upon sliding movement of said armature. The sealing means provides a fluid passage therein to establish communication between the third channel and one of the first and second channels when unsealed. The clearance space for sliding movement of the armature, extends around the armature and is separate from and independent of the fluid passage in the sealing means and thereby can be made substantially narrower in dimension than said fluid passage. The iron-free gap in the magnetic circuit between the slidable armature and a yoke tube of the magnetic circuit extends across the clearance space and thereby is formed in part by said clearance space. The sealing means comprises a non-magnetic unit fixed in a recess in the armature and having protruding ends for selectively sealing the first and second channels upon sliding movement of the armature.

In accordance with a feature of the invention, the sealing unit comprises a central part joined to an outer part by radial ribs which are circumferentially spaced to define the fluid passage therebetween.

BRIEF DESCRIPTION OF THE DRAWING

The sole figure of the drawing is a longitudinal cross-section through a preferred embodiment of a reversing valve according to the present invention.

DETAILED DESCRIPTION OF THE PREFERRED EMBODIMENT

In the drawing, there is shown an electromagnetic reversing valve 1 comprising a plastic housing 2 containing a magnetic coil 3 and electrical connections 4 to energize the coil from an electrical power supply (not shown). The coil 3 is operatively coupled in a magnetic circuit formed by a yoke 5, a pole tube 6 joined to the yoke and to an armature core 7 and a slidable magnetic armature 9 forming an iron-free gap 8 with the pole tube 6 in the magnetic circuit. Armature 9 is slidable in a space 10 in housing 2 between two longitudinally aligned fluid passages or channels 11, 12 having open ends forming respective valve seats 13, 14. Magnetic armature 9 and space 10 are dimensioned to provide a minimum slidable clearances for the armature 9 in the housing and thereby provide a minimum size for the iron-free gap 8 which extends across the clearance. Armature 9 is formed as a tube and has a tubular recess 15 extending longitudinally therein in which a plastic unit 16 is fixed. The plastic unit 16 has a central part 17 with protruding elastomer ends 18, 19 forming seals for seating on the valve seats 13, 14 to close passages 11, 12. The central part 17 is integrally joined to an outer coaxial part 21 of the plastic unit 16 by circumferentially spaced, radial ribs 20, so that fluid flow passages 22 are formed by an annular space between central part 17 and outer part 21.

A spring 23 is interposed between central part 17 and armature core 7 to urge the armature 9 against valve seat 13 of the passage 11. The passage 12 is formed in the armature core 7 itself. The space 10 communicates with a third passage 24 extending transversely. Depending on whether or not current is supplied to coil 3, the passage 11 is connected to passage 24 and passage 12 is closed, or passage 12 is connected to passage 24, and passage 11 is closed (as shown).

Between pole tube 6 and armature 9, there is only the extremely small iron-free gap 8 formed by the clearance of armature 9 in space 10 and an intermediate wall 25 of plastic housing 2 in this region. A large magnetic force results due to this small iron-free gap. In this way, the range of movement of the reversing valve is increased, or the size or number of windings of coil 3 can be reduced.

As evident from the above, by forming the passages 22 in the seal unit separately and independent from the clearances between the armature 9 and the housing 2, it is possible to make the clearances much narrower than the passages 22 without affecting the fluid flow through the sealing unit between passage 24 and passage 12 when the latter is unsealed.

Although the invention has been described in relation to a specific embodiment thereof, it will become apparent to those skilled in the art that numerous modifications and variations can be made within the scope and spirit of the invention as defined in the attached claims.

What is claimed is:

1. An electromagnetic reversing valve comprising:

a housing providing first, second and third fluid passages, a slidable armature member in said housing for establishing communication of said third passage selectively with said first and second passages, a magnetic circuit in said housing including said slidable armature member, said slidable armature member being fitted with clearance in a space provided in said housing, means for energizing said magnetic circuit to displace said slidable armature member in a longitudinal direction between first and second end positions, said slidable armature member being provided with a recess, and a non-magnetic unit fixed in said recess for longitudinal displacement with said armature member, said unit including a central part, and an outer part connected to said central part to define a flow passage therebetween providing fluid communication through said unit, and first and second seals on said central part respectively facing said first and second passages for selectively and respectively opening and closing said first and second passages in response to displacement of said slidable armature member to provide connection of said third passage selectively with one of said first and second passages, said slidable armature member comprising a tube having an inner tubular opening forming said recess in which said non-magnetic unit is fixed, said non-magnetic unit being tubular with said outer part fixed to said slidable armature member and said flow passage being between said outer part and said central part, said first and second seals being integrally connected with one another through said central part, said magnetic circuit further including a yoke surrounding said armature member and embedded in said housing to define an iron-free gap with said armature member, said gap being formed in part by a portion of the housing between the yoke and the armature member and in part by a clearance between the armature member and said portion of the housing, said armature member being slidable in said housing due to said clearance, said clearance being separate from and independent of said flow passage in said unit and substantially narrower in dimension than said flow passage.

2. An electromagnetic reversing valve as claimed in claim 1, wherein said housing is made of non-magnetic material and said unit comprises plastic material.

3. An electromagnetic reversing valve as claimed in claim 1, wherein said first and second passages are arranged longitudinally in the direction of sliding movement of the armature member.

4. An electromagnetic reversing valve as claimed in claim 3, wherein said first and second passages are aligned.

5. An electromagnetic reversing valve as claimed in claim 4, wherein said slidable armature member is interposed between said first and second passages.

6. An electromagnetic reversing valve as claimed in claim 5, wherein said third passage extends transversely and opens into said space.

7. An electromagnetic reversing valve as claimed in claim 6, wherein said flow passage in said unit is in fluid communication with said space and with said second passage when the latter is not closed by said second seal.

8. An electromagnetic reversing valve as claimed in claim 1, comprising an armature core fixed in said housing and defining said second passage, and spring means between said armature core and said unit for urging said unit to close said first passage by said first seal.

9. An electromagnetic reversing valve as claimed in claim 1, wherein said seals protrude at opposite ends of said unit.

10. An electromagnetic reversing valve as claimed in claim 1, wherein said magnetic circuit comprises an armature core in said housing, said second passage being provided in said armature core.

11. An electromagnetic reversing valve as claimed in claim 1, wherein said unit further comprises radial, circumferentially spaced ribs connecting said central and outer parts and forming said flow passage through the unit.

12. An electromagnetic reversing valve as claimed in claim 11, wherein said central and outer parts of said unit are coaxial and form an annular space therebetween which comprises said flow passage, said ribs connecting said central and outer parts together as an integral body.

* * * * *